United States Patent Office 3,793,282
Patented Feb. 19, 1974

3,793,282
HEAT-HARDENABLE CARRIER-FREE FOILS
Jurgen Fock, Essen-Bredeney, and Ulrich Holtschmidt, Essen, Germany, assignors to Th. Goldschmidt AG, Essen, Germany
No Drawing. Filed Mar. 2, 1973, Ser. No. 337,698
Int. Cl. C08f 45/04, 45/38
U.S. Cl. 260—31.8 M                 10 Claims

ABSTRACT OF THE DISCLOSURE

This invention relates to a heat-hardenable, carrier-free foil which is stable in storage, and impact-resistant in the hardened condition thereof, which contains 0.05 to 1% by weight of acid catalyst, and (A) an elastomeric copolymerizate which has a glass point of not more than $+10°$ C., and which is obtained by polymerization of
    ($A_1$) 70 to 99% by weight of an acrylic acid alkyl ester with 1 to 8 carbon atoms in the alkyl residue, and
    ($A_2$) 1 to 20% by weight of at least one compound selected from the group consisting of hydroxyalkyl ester with 2 to 4 carbon atoms in the alkyl residue and an acid amide of acrylic acid or methacrylic acid,
wherein the sum of the component $A_1$ and $A_2$ add up to 100% by weight, and
(B) a hard-brittle copolymerizate obtained in the presence of the copolymerizate A by polymerization of
    ($B_1$) 60 to 80% by weight of at least one compound selected from the group consisting of styrene and a methacrylic acid alkyl ester with 1 to 20 carbon atoms in the alkyl residue,
    ($B_2$) 1 to 20% by weight of an acrylic acid alkyl ester with 1 to 8 carbon atoms in the alkyl residue,
    ($B_3$) 1 to 20% by weight of at least one compound selected from the group consisting of an N-methoxy-methyl amide of acrylic acid or methacrylic acid,
    ($B_4$) 1 to 20% by weight of a hydroxy-alkyl ester of acrylic acid or methacrylic acid with 2 to 4 carbon atoms in the alkyl residue, and
    ($B_5$) 1 to 20% by weight of acrylic or methacrylic acid amide, wherein the molar ratio of the component $B_3$ to the sum of $B_4$ and $B_5$ is approximately 1:1 and the ratio of $B_4:B_5$ is 4:1 to 1:4,
wherein the sum of the components $B_1$ to $B_5$ adds up to 100% by weight, and wherein the weight ratio of the elastomeric copolymerizate A to the hard-brittle copolymerizate B is 1:3 to 1:20. The invention also relates to a process for the preparation of the heat-hardenable carrier-free foils.

The present invention relates to a heat-hardenable, carrier-free foil which is unaffected by storage and is impact-resistant in the fully hardened condition thereof, and which contains 0.05 to 1% by weight of acid catalyst. The invention also relates to a process for making these foils.

The present invention relates, more particularly, to a heat-hardenable foil composed of a polymerizate mixture which, when pressed with the application of pressure and heat upon surfaces of materials, especially wood sheets or panels, forms surface layers upon hardening which are impact-resistant and highly resistant to weathering.

It is known in the art to coat and to treat the surfaces of wood sheets or panels, such as chipping sheets, by pressing thereon heat-hardenable products at high temperatures. Used for this purpose are generally synthetic resins which harden due to a condensation reaction. Such synthetic resins are, for example, preliminary condensates of phenol-formaldehyde resins or urea resins and/or melamine-formaldehyde resins. These resins cannot, however, be processed or treated to self-supporting elastic foils so that solutions of these resins must be applied to carrier widths or sheets, particularly webs of paper. After drying thereof to a specific moisture content, the resin-provided or coated carrier widths or sheets may be used for the surface treatment.

It also has been already proposed to impregnate and coat carrier widths or sheets with resins which harden by polymerization. Examples of such resins are the diallyl phthalate preliminary polymerizates. The preparation of these preliminary polymerizates and the impregnation of the carrier widths or sheets with these preliminary polymerizates involve, however, considerable difficulties. Another disadvantage is that a radical hardening catalyst must be added to the resins, which limits the storability of the products obtained from or with this process. Furthermore, when being compressed, the resins have a tendency to adhere to the pressing sheet. In addition, carrier sheets or widths of paper have disadvantages insofar as the weathering resistance thereof is concerned.

In order to reduce the brittleness of thermoplastic polymerizates it already has been suggested that either natural or synthetic rubber be added thereto. Thus obtained—according to Belgian Pats. Nos. 552,579 and 558,041—by graft polymerization of butadiene-styrene-mixed polymerizates are impact-resistant injection molding compositions. According to German Pat. No. 1,076,-377, thermoplastic, impact-resistant molding compositions are prepared by polymerization of methylmethacrylate in the presence of a mixed polymerizate of butadiene and methylmethacrylate.

It is further known from Belgian Pat. No. 564,366 that the internal toughness of such thermoplastic molding masses can be improved by the introduction of acrylonitrile thereinto. The impact toughness may be improved also by virtue of the fact that the elastomeric component is cross-linked to a limited extent. This may be obtained, for example, by the addition to the monomer mixture of divinyl benzene or other bifunctionally addable compounds.

These copolymerizates of the prior art remain, however, thermoplastic. They have the additional disadvantages that because of the olefinic character of the elastomeric components, based on dienes, the aging stability and particularly the weathering stability thereof are unsatisfactory. The good impact toughness is lost within a relatively short period of time due to the influence of air, light, and heat.

Known from the German Offenlegungsschrift No. 2,116,653 is a multiphase compound copolymer composed of (A) a first elastomeric phase, prepared by the polymerization of a monomer mixture from at least approximately 50% by weight of an alkylacrylate or an aralkylacrylate, or a mixture thereof, approximately 0.05 to 5.0% by weight of a cross-linked monomer, approximately 0.05 to 5.0% by weight of a grafting monomer, approximately 0 to 10.0% by weight of a hydrophilic monomer, and a complementing quantity of another copolymerizable ethylenically unsaturated monomer, and
(B) a second hard thermoplastic phase, prepared by the polymerization of a monomer mixture containing at least approximately 50% by weight of an alkylmethacrylate in the presence of the elastomeric phase, wherein the elastomeric and the thermoplastic phase have a chemical minimum compound degree of about 20%.

These products are not hardenable, however. This has the result that the chemical resistance and the weathering capability are relatively low.

Known in the art are, moreover, hardenable thermoplastic polymerizates designed for purposes of surface coating, and used for the preparation thereof are, inter alia, also monomers which result per se in elastomeric polymerizates. A specific two-stage manufacturing process has been described in U.S. Pat. No. 3,297,621. Produced thereby are, however, products which harden already at room temperature—and which are accordingly not storable—and furthermore cannot be treated or processed to hard foils.

Furthermore, U.S. Pat. No. 3,505,128 describes coating agents which are not present in the form of pre-formed foils, but are based on copolymerizates which contain as reactive groups hydroxy-, carboxy-, methylol-, and/or methoxymethyl groups, and in addition independently cross-linking substances, for example chromium-VI compounds. When this process was repeated or re-worked, however, it was found that, due to the incompatibility of the copolymerizate and the cross-linking agent, the latter does not remain homogeneously distributed within the substance, but is concentrated at the bordering or marginal surfaces. Aside from transparency flaws, this leads to cross-linking disturbances since the coatings are at the interior extremely poor in cross-linking agent.

During an attempt to obtain non-cross-linked, hardenable, carrier-free foils from the products according to the process described in the foregoing patent, it was found that such was impossible since the reactive groups and the cross-linking agent react prematurely with each other. Also, in all experiments a distinct yellow to green discoloration was noticeable because of the presence of the heavy metal cross-linking agent.

Known from German Offenlegungsschrift No. 1,961,452, is a heat-hardenable carrier-free foil which is composed of
(A) an elastomeric copolymerizate which is obtained by polymerization of
 (a) 70 to 99% by weight of an acrylic acid alkyl ester whose alkyl residue has 1 to 8 carbon atoms,
 (b) 1 to 20% by weight of an unsaturated monocarboxylic acid, or of an anhydride of an unsaturated dicarboxylic acid,
if desired
 (c) 0 to 20% by weight of a vinyl monomer which yields upon homopolymerization a hard-brittle polymerizate, particularly styrene, acrylonitrile, or methylmethacrylate,
and if desired
 (d) 0 to 2% by weight of a cross-linking monomer with at least two reactive non-conjugated double bonds in the molecule, and
(B) a hard-brittle copolymerizate which is obtained by polymerization of
 (a) 60 to 70% by weight of styrene or of a methacrylic acid alkyl ester whose alkyl residue has 1 to 4 carbon atoms,
 (b) 1 to 20% by weight of a glycidyl ester of acrylic acid or methacrylic acid,
 (c) 1 to 20% by weight of an unsaturated monocarboxylic acid, or of an anhydride of an unsaturated dicarboxylic acid,
if desired
 (d) 0 to 20% by weight of a vinyl monomer which yields upon homopolymerization a hard-brittle polymerizate, particularly styrene, acrylonitrile, or methylmethacrylate,
and if desired
 (e) 0 to 3% by weight of vinylpyridine,
the weight ratio of the elastomeric copolymerizate A to the hard-brittle copolymerizate B being 1:20 to 1:3.

The foil obtained according to this Offenlegungsschrift already combines significant properties which are required as far as heat-hardenable carrier-free polymerizate foils are concerned. It has been found, however, that in some cases, particularly during storage in hot climates, the storability of these foils is still limited and not sufficient in all instances.

It is therefore the object of the present invention to provide heat-hardenable copolymerizate foils which do not have the aforementioned disadvantages and which have other advantageous properties, which will be specifically referred to hereinafter.

In proceeding with the work for the purpose of improving the foil according to Offenlegungsschrift No. 1,961,452, it was found to be necessary to depart from the cross-linking principle as disclosed therein.

As a possibly suitable cross-linking principle, a process offers itself as has been described in the following literature and patent references: "Die makromolekulare Chemie" (Macromolecular Chemistry) 57 (1961), pp. 27 to 51; "Die angewandte makromolekulare Chemie" (Applied Macromolecular Chemistry) 9, (1962), pp. 1 to 15, ibidem 11 (1970), pp. 125 to 134, and German Pats. Nos. 1,035,363 and 1,011,850.

It now has been surprisingly found that the requirements which in practice are raised in connection with, and are expected to be satisfied by, a heat-hardenable carrier-free copolymerizate foil are fulfilled by a foil which, according to the present invention, is composed of (A) an elastomeric copolymerizate which has a glass point of not more than +10° C., preferably below −25° C., and is obtained by polymerization of
 ($A_1$) 70 to 99% by weight of an acrylic acid alkyl ester with 1 to 8 carbon atoms in the alkyl residue,
 ($A_2$) 1 to 20% by weight of a hydroxyalkyl ester with 2 to 4 carbon atoms in the alkyl residue and/or of an acid amide of acrylic acid or methacrylic acid, and, if desired,
 ($A_3$) 0 to 2% by weight of a cross-linking monomer with at least two reactive non-conjugated double bonds in the molecule, wherein the reactivity of the double bond may be variable,
 wherein the sum of the components $A_1$ to $A_3$ must add up to 100% by weight, and
(B) a hard-brittle copolymerizate obtained in the presence of the copolymerizate A by polymerization of
 ($B_1$) 60 to 80% by weight of styrene and/or a methacrylic acid alkyl ester with 1 to 20 carbon atoms in the alkyl residue,
 ($B_2$) 1 to 20% by weight of an acrylic acid alkyl ester with 1 to 8 carbon atoms in the alkyl residue,
 ($B_3$) 1 to 20% by weight of an N-methoxymethylamide of acrylic acid and/or methacrylic acid,
 ($B_4$) 1 to 20% by weight of a hydroxy-alkyl ester of acrylic acid or methacrylic acid with 2 to 4 carbon atoms in the alkyl residue,
 ($B_5$) 1 to 20% by weight of acrylic or methacrylic acid amide, wherein the molar ratio of component $B_3$ to the sum of $B_4$ and $B_5$ is approximately 1:1, and the ratio of $B_4$:$B_5$ is 4:1 to 1:4,
 and, if desired,
 ($B_6$) 0 to 20% by weight of acrylonitrile,
wherein the sum of components $B_1$ to $B_6$ adds up to 100% by weight, and wherein the weight ratio of the elastomeric copolymerizate A to the hard-brittle copolymerizate B is 1:3 to 1:20.

The elastomeric copolymerizate A thus is obtained by polymerization of different unsaturated monomers. The main components are acrylic acid alkyl esters whose alkyl residue has 1 to 8 carbon atoms. Examples of such alkyl residues are the methyl-, ethyl-, propyl-, isopropyl-, and ethyl-hexyl-residues, but preferably the n-butyl residue.

The second component ($A_2$) is a hydroxyalkyl ester with 2 to 4 carbon atoms in the molecule and/or an acid amide of acrylic acid or methacrylic acid. Suitable as hydroxyalkyl esters of acrylic acid or methacrylic acid are particularly the monoesters of ethylene glycol, propylene glycol, and butane-diol-1,4.

As the third component ($A_3$) there may be present in the elastomeric copolymerizate cross-linking monomers with at least two reactive non-conjugated double bonds in the molecule. The reactivity of the double bonds may be different. Examples of cross-linking monomers with two reactive non-conjugated double bonds in the molecule, with the reactivity of the double bonds being equal, are diacrylic esters of bivalent alcohols, such as ethylene glycol or propylene glycol. A further example is the methacrylic acid diester of butane-diol-1,4; also divinyl- or trivinylbenzene, diallylphthalate, methacrylic acid vinyl ester, and trimethylolpropane trimethacrylate. This addition improves the impact toughness of the copolymerizate. Monomers with at least two reactive double bonds in the molecule whose reactivity with respect to the double bonds is different are allyl esters of acrylic acid or methacrylic acid, methallyl- and crotyl esters of acrylic acid and methacrylic acid, maleic acid, itaconic acid, and fumaric acid, and vinyl esters of allyl acetic acid. These monomers render possible the chemical union of components A and B by a grafting reaction and thus improve not only the impact toughness but also the water resistance thereof.

The hard-brittle copolymerizate B contains as the main component $B_1$ 60 to 80% by weight of styrene and/or methacrylic acid alkyl-ester with 1 to 20 carbon atoms in the alkyl residue. Preferable are alkyl residues with from 1 to 4 carbon atoms. Also alkyl residues with more carbon atoms may be advantageously employed; for example the lauryl or stearyl residue.

The second component ($B_2$) is an acrylic acid alkyl ester with 1 to 8 carbon atoms in the alkyl residue. Particularly preferred in this connection are alkyl residues with from 1 to 4 carbon atoms.

The components $B_3$, $B_4$, and $B_5$ are in a special category since they assure an optimal hardening.

The component $B_3$ is the N-methoxymethylamide of acrylic acid and/or methacrylic acid.

The component $B_4$ is a hydroxyalkylester of acrylic acid or methacrylic acid with 2 to 4 carbon atoms in the molecule. What is involved here is the hydroxyalkylester which already has been referred to in connection with the description of the component $A_2$.

The component $B_5$ is acrylic or methacrylic acid amide.

Of significance as far as the present invention is concerned is the ratio of the components $B_3$, $B_4$, and $B_5$ with respect to each other, and it is so provided for that optimal hardening characteristics are obtained. The molar ratio of the component $B_3$ to the sum of $B_4$ and $B_5$ should by definition be approximately 1:1, while the molar ratio of the component $B_4$ to the component $B_5$ should be 4:1 to 1:4.

Optionally, the hard-brittle copolymerizate B also may contain as component $B_6$ up to 20% by weight of acrylonitrile. The components $B_1$ to $B_6$ must together constitute, or add up to, 100% by weight.

The weight ratio of the elastomeric copolymerizate A to the hard-brittle copolymerizate B is 1:3 to 1:20. Preferred is a weight ratio of approximately 1:10.

Other substances with specific properties may be added to this inventive foil. From 1 to 15% by weight of a softener or plasticizer are preferably added to the copolymerizate mixture during preparation thereof. Preferred softeners are the phthalic acid alkyl- or aryl esters. The following softeners are particularly useful: dibutyl-, dihexyl-, and dioctylphthalate, dicyclohexylphthalate, benzylbutylphthalate, diphenylphthalate, or methylphthalyl-ethylglycolate, butylphthalylbutylglycolate, and chlorinated terphenyls.

The foils also may be colored by means of an addition of up to 25% by weight of pigments. Examples of such inorganic or organic pigments are titanium dioxide, zinc oxide, zinc sulfide, zinc chromate, zinc dust, minium, lead cyanamide, lead chromate, iron (II) and iron (III) oxide, iron cyan blue, chromium oxide, cadmium sulfide, cadmium mercury sulfide, antimony trioxide, antimony sulfide, ultramine, aniline black, phthalocyamines of different complex-forming metals, particularly copper, nickel, iron, quinacridone, azo-pigment dyes, and others.

Surprisingly, these pigments may be directly rubbed or ground with the solution of the copolymerizate mixture being used for making the foils, which has an excellent wetting property, without requiring the use of softeners, dispersing aids, or elastomers. If desired, known dispersing aids may be added.

The foil may be further improved with respect to the properties thereof in that admixed to the solution of the copolymerizate mixture prior to the foil casting are up to 5% by weight of an etherified melamine-formaldehyde resin. This melamine-formaldehyde resin should be precondensed and be present in the so-called B-state. Alcohols for the etherification of the melamine-formaldehyde resin are preferably lower alcohols, particularly butanol. This addition has the effect that the foil has better flowing properties on the surface to be treated, when being pressed on, and adheres better thereto. In addition thereto, the solvent stability of the hardened foil is thereby increased. This object also may be attained by a methylolated and etherified melamine, such as methoxymethylmelamine.

The foil contains small amounts, namely 0.05 to 1% by weight of an acid catalyst for accelerating the hardening process at elevated temperatures. In this system particularly suitable catalysts are: p-toluene sulfonic acid, 2-chlorethyl phosphate, 2-ethylhexylphosphate, 2-butoxyethylphosphate, phosphoric acid, perchloric acid, perchloric acid, vinylphosphoric acid, and trivinyl phosphoric acid.

It is also possible to admix known commercially available UV stabilizers to the foil in small amounts and, if desired, antistatic agents. In order to prevent the adherence of the foils on the foil casting machines, it has further been found to be desirable to add separating agents to the batch to be cast or poured in the form of wax emulsions or similar separating agents available on the market.

The inventive foils not only display the required increased storage stability, but also have an improved flowing capacity at elevated temperatures. The extrudability of the foils on surfaces onto which phenol- or aminoplast-resin-impregnated carrier widths or sheets have already been pressed under hardening conditions is excellent. Likewise the adherence thereof to other surfaces, for example those from asbestos cement or those of plastics, is good.

The surfaces treated with the foils as proposed by the present invention may be highly stressed mechanically, they are resistant to most solvents, and will not become turbid or dull by the action of water thereon. This is due to the chemical union of the two phases which is not, however, accentuated to such a degree that the phase limits are completely blurred. As a result thereof, the susceptibility to develop cracks is totally avoided. The two-phase nature, i.e. the elastomeric component on the one hand, and the hard-brittle component on the other hand, has been proven with the electron microscope both in the unhardened and in the hardened condition. The particle size of the rubber-elastic particles is approximately $1\mu$.

In the preparation of the inventive foils, preferably the monomers constituting or forming the elastomeric copolymerizate A are first polymerized in solution, thereafter the monomers constituting or forming the hard-brittle copolymerizate B are added to the solution or to the emulsion of the copolymerizate A and polymerized, then admixed to the solution are, if desired, the additions of softener, pigment and/or condensation resin, and the desired foil is prepared from this product in a manner known per se by evaporating the solvent.

During the polymerization in the form of a solution, working is carried out at a temperature of from 30 to 70°

C. The polymerization takes place in a manner known per se. Suitable as solvents are, among others, methylene chloride, methanol, dioxane, tetrahydrofuran, methylethyl ketone, and mixtures thereof. It is of decisive importance for the choice of the solvent that it be able to dissolve the monomers as well as the polymerizate. In general the weight ratio of solvents to polymerizable monomers should be approximately 3 to 4:1. It is possible to use as polymerization initiators, for example, azodiisobutyric acid nitrile, benzoylperoxide, cumene hydroperoxide, and dicumene peroxide, in amounts of approximately 0.1 to 1% by weight, based upon the monomers.

It is also possible, however, to carry out the polymerization in the form of an emulsion.

For the preparation of the carrier-free foils, the solutions are cast or poured while the solvent evaporates.

The preparation of the inventive foils will now be further explained hereinafter on the basis of some examples, and the properties of the foils obtained thereby will be indicated therein.

EXAMPLE 1

(a) Preparation of an n-butylacrylate-(A) and methylmethacrylate-, methylacrylate- and n-butylmethacrylate (B)-containing grafting copolymerizate in solution (A) A mixture of 56 parts by weight of methylene chloride and 24 parts by weight of methanol is freed from dissolved oxygen by boiling at reflux. Thereafter 36.2 parts by weight of n-butylacrylate, 3.7 parts by weight of hydroxyethylmethacrylate, 0.08 part by weight of allyl methacrylate, and 0.04 part by weight of ethylene glycoldimethacrylate are added to the solvent mixture; nitrogen is passed therethrough for 1 hour, and thereupon the polymerization is initiated with 0.08 part by weight of azodiisobutyric acid nitrile. Stirring is effected at 60° for 6 hours under nitrogen, whereby an exchange of 85% of theoretical is obtained.

(B) In a second stage, 233.2 parts by weight of methylmethacrylate, 34.5 parts by weight of n-butylmethacrylate, 20.9 parts by weight of methylacrylate, 20.9 parts by weight of methoxymethylmethacrylamide, 6.8 parts by weight of methacrylamide, 10.5 parts by weight of hydroxyethylmethacrylate, and 32.9 parts by weight of stearylmethacrylate are dissolved, in the presence of the elastomeric copolymerizate (A), in 224 parts by weight of methylene chloride and 96 parts by weight of methanol. Initially, the mixture is freed from dissolved oxygen by boiling at reflux. Added thereafter is 0.72 part by weight of azodiisobutyric acid nitrile and stirring is effected for 12 hours at 60° C., whereby an exchange of 98% of theoretical is achieved.

The Staudinger index, determined in chloroform at 20° C., is 1.15 [100 ml./g.]. The polymerizate is soluble in benzene, methylene chloride, acetone, ethyl acetate, and tetrahydrofuran.

(b) Preparation and testing of a foil from the grafting copolymerizate obtained under (a)

Cast from the solution, after the addition of 0.1 part by weight of p-toluene sulfonic acid, is a foil whose impact strength (DIN 53 448) and pendulum hardness according to König (DIN 53 157) at room temperature in the unhardened condition are 91 [kp.·cm./cm.$^2$] and 88 [sec.], respectively, and in the hardened condition 76.5 [kp.·cm./cm.$^2$] and 102 [sec.], respectively. The swelling index (H. Dannenberg and W. H. Harp, Jr., Anal. Chem. 28 (1956), 86), determined after standing for 24 hours in a 1,2-dichloroethane atmosphere, amounts, after heating to 150° C. for 10 minutes, to 2.1.

A foil stored for 6 months at room temperature is not crosslinked and displays good flowing capacity during extrusion. A foil prepared by casting after the addition of 7.5% by weight of methylphthalylethylglycolate is extruded at 140° C. with 10 [kp./cm.$^2$] for 8 minutes on a sapele veneer. The foil is transparent and does not show any stress corrosion after the action thereon of methanol or ethanol-water mixtures. The hardened film is resistant to dilute acids and lyes, alcohol, and gasoline. Acetone, ethyl acetate and a 50% acetic acid solution swell it slightly, after a 24 hour action. Methylene chloride and trichloroethylene swell it without dissolving.

(c) Testing of a foil from the grafting copolymerizate obtained according to (a) prepared after the addition of butyletherified melamine resin Due to the addition to the copolymerizate of 0.5% by weight of a butyl-etherified melamine resin, a very slightly clouded foil is obtained which displays an additionally improved flowing capacity and adhesiveness, and, after thermal hardening (145° C./8 min./10 [kp./cm.$^2$]), displays an improved solvent stability against hydrogen chloride.

(d) Preparation and testing of a foil pigmented with titanium dioxide (pretreated with aluminum silicate) from the grafting copolymerizate obtained according to (a)

Added to 120 parts by weight of an 18% by weight solution, based upon solid substance, of the copolymerizate in methylene chloride-methanol (7:3) are 4.4 parts by weight of TiO$_2$ pigment and 185 parts by weight of steel balls. In a vibrating ball mill (Red-Devil) after 1 hour grinding, a very good dispersion is obtained. A foil cast from the pigment-binding agent mixture with a layer thickness of 50μ displays on a chipping plate, extruded with a chrome-plated sheet, good adhesion, good covering power, and a flawless film surface with a high luster.

EXAMPLE 1a

Preparation and testing of an n-butylacrylate-methylmethacrylate, methylacrylate-, and n-butylmethacrylate-containing copolymerizate in solution in one step (non-inventive comparison)

The procedure is the same as in Example 1, except that the components of the first and second stages or phases are copolymerized together in one step. After a reaction time of 13 hours, an exchange of 98% of theoretical is obtained.

The Staudinger index, determined in chloroform at 20° C., is 0.92 [100 ml./g.]. A foil prepared by casting after the addition of 0.1% by weight of p-toluene sulfonic acid has an impact resistance and hardness in the unhardened condition of 50 [kp.·cm./cm.$^2$] and 88 [sec.], respectively, and, in the hardened condition, of 42 [kp.·cm./cm.$^2$] and 99 [sec.], respectively. This example shows clearly that the non-inventive copolymerizate has a reduced impact resistance.

EXAMPLE 2

(a) Preparation of a methylacrylate (A)- and methylmethacrylate-, methylacrylate- and n-butylmethacrylate (B)-containing grafting copolymerization in solution The method of operation is the same as in Example 1, but used in the components of Example 1 is, instead of n-butylacrylate, methylacrylate. The Staudinger index, determined in chloroform at 20° C., is 0.98 [100 ml./g.]. The polymerizate is soluble in benzene, methylenechloride, acetone, ethylacetate and tetrahydrofuran.

(b) Testing of a foil from the grafting copolymerizate obtained under (2a)

Cast from the solution, after the addition of 0.1% by weight of p-toluene sulfonic acid, is a foil whose impact resistance and hardness at room temperature in the unhardened condition are 85 [kp.·cm./cm.$^2$] and 104 [sec.], respectively, and in the hardened condition 72 [kp.·cm./cm.$^2$] and 118 [sec.], respectively. The swelling index, determined after heating to 150° C. for 10 minutes, is 2.0. The foil may be stored for at least 6 months.

A foil prepared after the addition of 5% by weight of dioctyl phthalate and pigmented with white according to Example (1d) is extruded at 145° C. with 30 [kp./cm.$^2$] for 8 minutes with the aid of separating paper on an asbestos cement sheet. Obtained were uniformly smooth surfaces; the adhesiveness of the foil is satisfactory and sufficient after cold water storage for 5 days. The foil does not show any stress corrosion after the action of methanol or ethanol-water mixtures. The hardened film is stable against dilute lyes and acids, alcohol and gasoline. Acetone, ethyl acetate and a 50% acetic acid solution swell it slightly after an action of 24 hours.

EXAMPLE 3

(a) Preparation of an ethylacrylate (A)- and methylmethacrylate-, methylacrylate- and n-butylmethacrylate (B)-containing grafting copolymerizate in solution The method of operation is as in Example 1, but used in the components of Example 1 is, instead of n-butylacrylate, ethylacrylate. The Staudinger index, determined in chloroform at 20° C., is 1.03 [100 ml./g.]. The polymerizate is soluble in benzene, methylene chloride, acetion, ethyl acetate, and tetrahydrofuran.

(b) Testing of foils from the grafting copolymerizate obtained under (a)

Cast from the solution, after the addition of 0.1% by weight of p-toluene sulfonic acid and 0.5% by weight of butyl-etherified melamine-formaldehyde is a foil. The impact resistance and hardness at room temperature in the unhardened condition are 89 [kp.·cm./cm.$^2$] and 98 [sec.], respectively, and in the hardened condition 75 [kp.·cm./cm.$^2$] and 109 [sec.], respectively. The swelling index (150° C./10 minutes) is 1.90. The foil is still well soluble after a storage of 6 months.

A foil prepared, after the addition of 7.5% by weight of ethyl phthalylmethylglycolate in addition to catalyst and melamine resin, is extruded on pine plywood at 145° C. with 15 [kp./cm.$^2$]. The surface is transparent. The pore structure of the wood is well marked. The coated wood sheets or panels were subjected to an alternating test: 2 days in a drying cabinet at 70° C.—2 days in cold water storage—2 days in the drying cabinet at 70° C. Even though the wood cracks and swells, the foil remains intact by concomitantly extending at the cracked points.

EXAMPLE 4

(a) Preparation of an n-butylacrylate (A)- and methylmethacrylate-, styrene-, acrylonitrile-, n-butylmethacrylate (B)- containing grafting copolymerizate in solution The method of operation is as in Example 1. The reaction mixture is composed as follows:

(A)

36.22 parts by weight of n-butylacrylate
3.7 parts by weight of hydroxyethylmethacrylate
0.08 part by weight of allyl methacrylate
56 parts by weight of methylene chloride
24 parts by weight of methanol, and
0.08 part by weight of azo-diiso-butyric acid nitrile.

Exchange: 77% after 6 hours at 60° C.

(B)

159.0 parts by weight of methylmethacrylate
68.4 parts by weight of stydene
5.8 parts by weight of acrylonitrile
34.5 parts by weight of n-butylmethacrylate
20.9 parts by weight of methylacrylate
20.9 parts by weight of methoxymethylmethacrylamide
6.8 parts by weight of methacrylamide
10.5 parts by weight of hydroxyethylmethacrylate
32.9 parts by weight of stearylmethacrylate
224 parts by weight of methylene chloride
96 parts by weight of methanol, and
0.72 part by weight of azo-diiso-butyric acid nitrile.

Exchange: 92% after 21 hours at 60° C.

The Staudinger index, determined in chloroform at 20° C., is 0.75 100 ml./g. The polymerizate is soluble in benzene, methylene chloride, acetone, ethyl acetate, and tetrahydrofuran.

(b) Testing of a foil from the grafting copolymerizate obtained under (a)

Cast from the solution is a foil, after the addition of 0.1% by weight of p-toluene sulfonic acid. The impact resistance and hardness at room temperature in the unhardened condition are 125 [kp.·cm./cm.$^2$] and 105 [sec.], respectively, and, in the hardened condition, 102 [kp.·cm./cm.$^2$] and 110 [sec.], respectively. The swelling index (150° C./ 10 minutes) is 2.8. The foil is still well soluble after a 6-month storage.

With a chrome-plated high-luster sheet and a melamine resin-impregnated decorating paper being placed thereunder, a roughened foil is extruded for 10 minutes at 145° C. with 20 [kp./cm.$^2$]. Obtained is a high-luster, uniform and slightly clouded surface. The adherence is satisfactory. The hardened foil shows, after the action of methanol or ethanol-water mixtures, no stress corrosion; it is stable against dilute acids and lyes, alcohol, and gasoline. Acetone, ethyl acetate and a 50% acetic acid solution will slightly swell it after a 24 hour action.

EXAMPLE 5

(a) Preparation of an n-butylacrylate (A)- and n-butylmethacrylate (B)- containing grafting copolymerizate in solution The method of operation is as in Example 1. The reaction mixture is composed as follows:

(A)

36.22 parts by weight of n-butylacrylate
3.7 parts by weight of hydroxyethylmethacrylate
0.08 part by weight of allyl methacrylate
56 parts by weight of methylene chloride
24 parts by weight of methanol, and
0.08 part by weight of azo-diiso-butyric acid nitrile.

Exchange: 82% after 5 hours of 60° C.

(B)

288.6 parts by weight of n-butylmethacrylate
20.9 parts by weight of methoxymethylmethacrylamide
6.8 parts by weight of methacrylamide
10.5 parts by weight of hydroxyethylmethacrylate
32.9 parts by weight of stearyl methacrylate
224 parts by weight of methylene chloride
96 parts by weight of methanol, and
0.72 part by weight of azo-diiso-butyric acid nitrile.

Exchange: 99% after 11 hours at 60° C.

The Staudinger index, determined in chloroform at 20° C., is 2.05. The polymerizate is soluble in benzene, methylene chloride, acetone, ethyl acetate, and tetrahydrofuran.

(b) Preparation and testing of a foil from the grafting copolymerizate obtained under (a)

Cast from the solution, after the addition of 0.1% by weight of 2-butoxy-ethyl-phosphate, is a foil. The impact resistance and hardness at room temperature in the unhardened condition are 145 [kp.·cm.$^2$] and 20 [sec], respectively, and in the hardened condition 125 [kp.·cm./cm.$^2$] and 28 [sec.], respectively. The swelling index (150° C./10 minutes) is 2.2.

The foil was extruded on gaboon plywood with 15 [kp./cm.²] at 145° C. for 6 minutes. The extrusion was flawless. The sheet was subjected to an alternating test: 2 days in a drying cabinet at 70° C.—2 days in cold water storage—2 days in the drying cabinet at 70° C. No cracks arose in the foil, and the transparency remained unaffected.

EXAMPLE 6

(a) Preparation of an ethylacrylate (A)- and ethylmethacrylate(B)-containing grafting copolymerizate in solution The method of operation is as in Example 1. The reaction mixture is composed as follows:

(A)

36.22 parts by weight of ethyl acrylate
3.7 parts by weight of hydroxyethylmethacrylate
0.08 part by weight of allyl methacrylate
56 parts by weight of methylene chloride
24 parts by weight of methanol, and
0.08 part by weight of azo-diiso-butyric acid nitrile.

Exchange: 78% after 5 hours at 60° C.

(B)

288.6 parts by weight of ethyl-methacrylate
20.9 parts by weight of methoxy-methyl-methacrylamide
6.8 parts by weight of methacrylamide
10.5 parts by weight of hydroxy-ethyl-methacrylate
32.5 parts by weight of stearyl methacrylate
22.4 parts by weight of methylene chloride
96 parts by weight of methanol, and
0.72 part by weight of azo-diiso-butyric acid nitrile.

Exchange: 98% after 12 hours at 60° C.

The Staudinger index in chloroform at 20° C. is 1.95 [100 ml./g.]. The polymerizate is soluble in benzene, ethyl acetate, methylene chloride, acetone, and tetrahydrofuran.

(b) Testing of a foil from the grafting copolymerizate obtained under (a)

Cast from the solution, after the addition of 0.1% by weight of butoxyethyl-phosphate, is a foil. The impact resistance and hardness thereof at room temperature in the unhardened condition are 86 [kp.·cm./cm.²] and 45 [sec.], respectively, and in the hardened condition (145° C./15 minutes) 62 [kp.·cm./cm.²] and 57 [sec.], respectively. The swelling index (150° C./10 minutes) is 2.38.

A foil extruded on a macoree veneer with a chipping plate or sheet base, with a silk matte presser plate (145° C./10 minutes/15[kp./cm.²]) results in a uniformly matte surface. The pore structure of the wood remains well preserved. The adherence of the foil to the wood in the dry condition or state and after cold water storage is good. There is no stress corrosion by methanol or ethanol-water (1:1). Dilute acids and lyes or mineral spirits will not have an adverse effect even after prolonged action; a 50% and 96% solution of ethanol or a 50% acetic acid solution will have only a minor effect, and acetone and ethyl acetate act to some extent; methylene chloride and trichloroethylene swell it slightly, but they do not dissolve it.

EXAMPLE 7

(a) Preparation of an n-butyl-acrylate(A)- and n-butyl-methacrylate(B)-containing grafting copolymerizate in solution The method of operation is as in Example 1. The reaction mixture is composed as follows:

(A)

27.2 parts by weight of butyl acrylate
2.8 parts by weight of hydroxyethyl-methacrylate
0.05 part by weight of ethylene glycol-dimethacrylate
0.06 part by weight of allyl acrylate
0.065 part by weight of azo-diiso-butyric acid nitrile
42 parts by weight of methylene chloride, and
18 parts by weight of methanol.

Exchange: 89.5% after 5 hours at 60° C.

(B)

288.6 parts by weight of n-butyl-methacrylate
20.9 parts by weight of methoxy-methyl-methacrylamide
6.8 parts by weight of hydroxy-ethyl-methacrylate
10.5 parts by weight of methacrylamide
32.5 parts by weight of stearyl methacrylate
22.4 parts by weight of methylene chloride
96 parts by weight of methanol, and
0.72 part by weight of azo-diiso-butyric acid nitrile.

Exchange: 98% after 11 hours at 60° C.

The Staudinger index in chloroform at 20° C. is 2.10 [100 ml./g.]. The polymerizate is soluble in benzene, ethyl acetate, methylene chloride, acetone, and tetrahydrofuran.

(b) Testing of a foil from the grafting copolymerizate obtained under (a)

A foil prepared from the copolymerizate after the addition of 0.1% by weight of p-toluene sulfonic acid has an impact resistance and hardness (measured at room temperature) in the unhardened condition of 120 [kp.·cm./cm.²] and 23 [sec.], respectively, and, in the hardened condition, of 111 [kp.·cm./cm.²] and 28 [sec.], respectively. The swelling index of the hardened foil (150° C./10 minutes) is 2.13.

A foil pressed on a chipping plate (145° C./8 minutes/15 [kp./cm.²]) is transparent, displays a flawless surface, and adheres well. No stress corrosion arises during the action of methanol or ethanol-water (1:1). Dilute acids and lyes, mineral spirits, and a 50% solution of alcohol do not have an adverse effect even in case of a prolonged action; acetone and ethyl acetate do not have an adverse effect with a shorter action or influence; methylene chloride and tri-chloroethylene swell it somewhat, without dissolving it, however. The foil is still completely soluble after 6 months of storage at room temperature and flows very well when extruded.

EXAMPLE 8

(a) Preparation of an n-butyl-acrylate(A)- and methyl-methacrylate-, butylmethacrylate-, methylacrylate-(B)-containing grafting copolymerizate in emulsion 100 parts by weight of water are freed from dissolved oxygen by boiling under nitrogen and cooled to 45° C. Added thereto are 2 parts by weight of sodium lauryl sulfate and a monomer mixture of 18.2 parts by weight of n-butylacrylate, 1.9 parts by weight of hydroxy-ethyl-methacrylate, and 0.04 part by weight of allyl methacrylate. The mixture is homogenized and subsequently added thereto dropwise is 0.25 part by weight of potassium peroxy disulfate (dissolved in 5 parts of water). During the reaction, the temperature is constantly kept at 45° C., and stirring is effected under nitrogen. After 6 hours, cooling to 0° C. is effected. There results a yield of 97% of theoretical. Added thereupon are 300 parts by weight of oxygen-free water, containing 6 parts by weight of sodium lauryl sulfate, a monomer mixture of 116 parts by weight of methyl-methacrylate, 17.2 parts by weight of n-butyl-methacrylate, 10.4 parts by weight of methylacrylate, 10.4 parts by weight of methoxymethyl-methacrylamide, 3.4 parts by weight of methacrylamide, 5.3 parts by weight of hydroxy-ethyl-methacylate, and 16.4 parts by weight of stearyl-methacrylate, 0.28 part by weight of cumene hydroperoxide, and 0.45 part by weight of ascorbic acid. Stirring is effected at 0° C. for 5 hours under nitrogen. The exchange amounts to 99% of theoretical.

The dispersion is introduced into 1000 parts by weight of methanol and the precipitated copolymerizate is repeatedly washed in water; thereafter, 1000 parts by weight of methanol are again added and squeezed off with a filter press.

The Staudinger index, measured at 20° C. in toluene, amounts to 2.25 [100 ml./g.]. The polymerizate is soluble in benzene, toluene, methylene chloride, methylethylketone, and tetrahydrofuran.

(b) Testing of a foil as obtained according to (a)

The impact resistance and hardness of a foil from this grafting copolymerizate which was prepared by casting from a solution in methylene chloride-methanol (7:3) are, in the unhardened condition, 96 [kp.·cm./cm.$^2$] and 102 [sec.], respectively and, in the hardened condition 82 [kp.·cm./cm.$^2$] and 113 [sec.], respectively. The swelling index is 2.0.

A foil extruded at 145° C. at a pressure of 15[kp./cm.$^2$] for 10 minutes onto a plywood sheet is transparent and adheres well; no stress corrosion arises during the action of methanol or ethanol-water mixtures. The hardened foil is stable against dilute acids and lyes, and against ethanol and benzene. Acetone and ethyl acetate attack it only to a limited extent after a short-term action; methylene chloride and trichloroethylene swell it somewhat, but do not dissolve it.

It will be obvious to those skilled in the art that many modifications may be made within the scope of the present invention without departing from the spirit thereof, and the invention includes all such modifications.

What is claimed is:

1. A heat-hardenable, carrier-free foil which is stable in storage, and impact-resistant in the hardened condition thereof, which contains 0.05 to 1% by weight of acid catalyst, and
   (A) an elastomeric copolymerizate which has a glass point of not more than +10° C., and which is obtained by polymerization of
      ($A_1$) 70 to 99% by weight of an acrylic acid alkyl ester with 1 to 8 carbon atoms in the alkyl residue, and
      ($A_2$) 1 to 20% by weight of at least one compound selected from the group consisting of a hydroxyalkyl ester with 2 to 4 carbon atoms in the alkyl residue and an acid amide of acrylic acid or methacrylic acid,
   wherein the sum of the components $A_1$ and $A_2$ adds up to 100% by weight, and
   (B) a hard-brittle copolymerizate obtained in the presence of the copolymerizate A by polymerization of
      ($B_1$) 60 to 80% by weight of at least one compound selected from the group consisting of styrene and a methacrylic acid alkyl ester with 1 to 20 carbon atoms in the alkyl residue,
      ($B_2$) 1 to 20% by weight of an acrylic acid alkyl ester with 1 to 8 carbon atoms in the alkyl residue,
      ($B_3$) 1 to 20% by weight of at least one compound selected from the group consisting of an N-methoxy-methyl amide of acrylic acid or methacrylic acid,
      ($B_4$) 1 to 20% by weight of a hydroxy-alkyl ester of acrylic acid or methacrylic acid with 2 to 4 carbon atoms in the alkyl residue, and
      ($B_5$) 1 to 20% by weight of acrylic or methacrylic acid amide, wherein the molar ratio of the component $B_3$ to the sum of $B_4$ and $B_5$ is approximately 1:1 and the ratio of $B_4$:$B_5$ is 4:1 to 1:4,
   wherein the sum of the components $B_1$ to $B_5$ adds up to 100% by weight, and wherein the weight ratio of the elastomeric copolymerizate A to the hard-brittle copolymerizate B is 1:3 to 1:20.

2. A foil according to claim 1 in which component A contains, in addition, up to 2% by weight of a crosslinking monomer ($A_3$) having at least two reactive non-conjugated double bonds in the molecule, wherein the sum of components ($A_1$) to ($A_3$) adds up to 100% by weight.

3. A foil according to claim 2 in which the reactivity of the double bonds in monomer ($A_3$) is variable.

4. A foil according to claim 1 in which component B contains, in addition, up to 20% by weight of acrylonitrile, wherein the sum of components $B_1$ to $B_6$ adds up to 100% by weight.

5. A foil according to claim 1 which contains 1 to 15% by weight of a softener.

6. A foil according to claim 5 in which the softener is phthalic acid alkyl or aryl ester.

7. A foil according to claim 1 which contains up to 25% by weight of a color-imparting pigment.

8. A foil according to claim 1 which contains up to 5% by weight of an etherified melamine-formaldehyde resin which is present in the B-condition.

9. A process for making a foil according to claim 1 which comprises polymerizing the monomers of elastomeric copolymerizate A in a liquid,
   adding the monomers of hard-brittle copolymerizate B to said liquid containing copolymerizate A and polymerizing said monomers,
   and forming the foil by evaporation of the liquid.

10. A process according to claim 9 in which the liquid contains at least one additive selected from the group consisting of a softener, a pigment, and a condensation resin.

References Cited
UNITED STATES PATENTS 3,644,584   2/1972   Fryd _____ 260—885 X LEWIS T. JACOBS, Primary Examiner E. S. PARR, Assistant Examiner U.S. Cl. X.R.

260—41 R, 856, 885

UNITED STATES PATENT OFFICE
CERTIFICATE OF CORRECTION

Patent No. 3,793,282              Dated February 19, 1974

Inventor(s) Jurgen Fock and Ulrich Holtschmidt

It is certified that error appears in the above-identified patent and that said Letters Patent are hereby corrected as shown below:

After line 6, Column 1, the following should be added: - - - Claims priority, application Germany, March 17, 1972, P 22 12 928.8 - - -.

Column 3, line 17, "carboxy-" should read - - - carboxyl- - - -.

Column 6, line 32, delete "perchloric acid", first occurrence.

Column 8, line 57, "copolymerization" should read - - - copolymerizate - - -.

Column 9, line 67, "stydene" should read - - - styrene - - -.

Column 10, line 72, $kp \cdot cm.^2$ should read - - - $kp \cdot cm/cm^2$ - - -.

Column 12, line 68, "-methacylate" should read - - - -methacrylate - - -.

Signed and sealed this 9th day of July 1974.

(SEAL)
Attest:

McCOY M. GIBSON, JR.
Attesting Officer

C. MARSHALL DANN
Commissioner of Patents